R. LOHSE.
FLUID METER.
APPLICATION FILED JULY 8, 1911.
1,025,633.
Patented May 7, 1912.
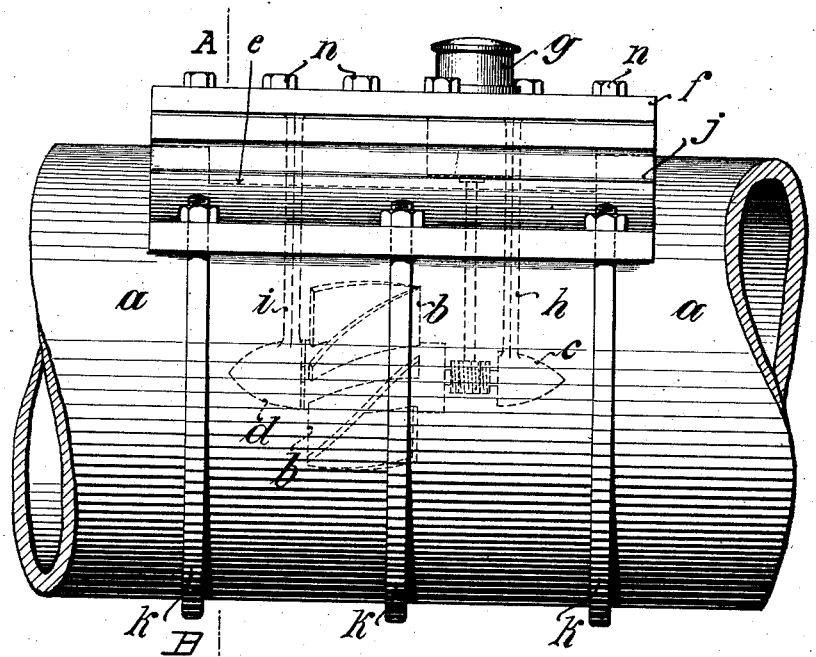
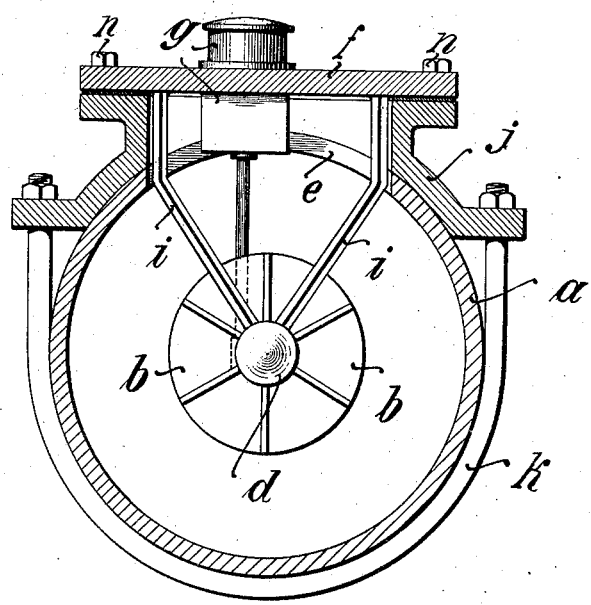
Witnesses:
P. F. Nagle.
L. Douville.
Inventor:
Richard Lohse
By Wiedersheim & Fairbanks,
Attorneys.

UNITED STATES PATENT OFFICE.

RICHARD LOHSE, OF BRESLAU, GERMANY.

FLUID-METER.

1,025,633. Specification of Letters Patent. Patented May 7, 1912.

Application filed July 8, 1911. Serial No. 637,528.

*To all whom it may concern:*

Be it known that I, RICHARD LOHSE, a German subject, residing at Nos. 77–81 Siebenhufenerstrasse, Breslau, Germany, have invented new and useful Improvements in Fluid-Meters, of which the following is a specification.

This invention is in the nature of an improvement upon the fluid meter described in my Letters Patent No. 990208 and it has for its object to provide a device of this nature which may be employed also in case the pipe or conduit does not allow of interruption, that is, of removing a portion thereof, as would be required for inserting the meter casing in place. The invention will be useful, for instance, if the working of the pipe should not be interrupted at all or but for a short time. To such end I arrange the pipe itself to form the meter casing. This is obtained by providing, in the upper portion of the pipe, an opening that allows the Woltmann's sail wheel to be inserted, means being disposed for securing the sail wheel in place.

My invention will be understood from the following description and be particularly pointed out in the appended claims, reference being had to the accompanying drawing which shows a form of construction embodying my improvements.

In these drawings, Figure 1 is a side elevation, Fig. 2 a vertical cross section on the line A B of Fig. 1.

The pipe $a$ has the opening $e$ in its upper portion. For closing this opening a cover $f$ is provided which carries the Woltmann's sail wheel $b$, mounted in bearings $c$, $d$ attached to the cover $f$ by brackets $h$, $i$, while also the case $g$ which contains the measuring gear is secured to such cover. The opening $e$ is of such an extension that the sail wheel $b$ can be passed therethrough into the pipe $a$. Suitable means may be employed for detachably connecting the cover $f$ with the pipe $a$. The drawing shows a support $j$ on which the cover $f$ is secured by screws $n$, this support resting on the pipe $a$ and being secured thereto by bows $k$ which embrace the pipe. It will be seen that in this way the pipe need not have a portion capable of being removed therefrom for interposing the measuring device into the pipe.

Changes in the form, proportion, size, and the minor details may be made within the scope indicated by the appended claim, without departing from the spirit or sacrificing any of the advantages of this invention.

What I claim, and desire to secure by Letters Patent, is:

The combination with a fluid pipe, having an opening in its wall, of a fluid meter comprising a cover, a measuring gear supported on such cover and a Woltmann's sail wheel carried by the cover, the latter being adapted to close the said opening and the Woltmann's sail wheel to be inserted through such opening, and means for detachably securing the said cover to the said pipe, substantially as set forth.

In witness whereof I have hereunto signed my name this 22nd day of June 1911, in the presence of two subscribing witnesses.

RICHARD LOHSE.

Witnesses:
ERNST KATZ,
ERNST B. CRISOT.

Copies of this patent may be obtained for five cents each, by addressing the "Commissioner of Patents, Washington, D. C."